United States Patent Office 3,503,755
Patented Mar. 31, 1970

3,503,755
METHOD OF PREPARING A POULTRY PRODUCT
Robert G. McGowan, St. Louis, Mo., assignor to Ralston Purina Company, St. Louis, Mo., a corporation of Missouri
No Drawing. Filed Nov. 3, 1966, Ser. No. 591,702
Int. Cl. A22c 21/00
U.S. Cl. 99—107                                 3 Claims

ABSTRACT OF THE DISCLOSURE

The method of preparing a poultry product including the step of incising the dark poultry meat pieces to form slits through the muscle sheaf thereon and mixing the incised dark poultry meat pieces with a binder matrix. The slits in the dark poultry meat pieces being effective to permit the matrix to be imbedded therein to insure that the muscle sheaf on the dark poultry meat pieces does not prevent binding between the dark poultry meat pieces and matrix. The mixture is then formed into a product which upon cooking is capable of being sliced into integral slices and of retaining its integrity at normal and heated temperatures.

---

This invention relates to a method of preparing a food product and more particularly to an improved method of preparing a poultry product in the form of a roast or the like which, upon cooking, is capable of being sliced into integral slices and which exhibits improved properties.

Briefly, the present invention is directed to the method of preparing a food product which comprises the steps of comminuting raw poultry skin to fibriform consistency to form a fibrous binder matrix, cooling the poultry skin during comminution thereof, incising pieces of raw poultry meat so as to form slits therein without destroying the integrity of the pieces, mixing the incised pieces of poultry meat with said matrix to embed said matrix in said slits, and forming the resulting mixture into a product which, upon cooking, is capable of being sliced into integral slices and of retaining its integrity at normal and heated temperatures.

As is known in the art, various types of turkey rolls and similar products have been introduced to the market in recent years. These rolls are generally prepared by placing cooked or uncooked pieces of turkey meat in a casing under pressure, adding gelatin as a binder and freezing the stuffed casing which is then marketed in frozen form. More recently, turkey roasts, rolls and the like have been marketed which have been prepared in accordance with the methods described in Torr Patent No. 3,173,795. These methods generally involve the steps of comminuting raw poultry skin or poultry meat or mixtures of skin and meat to fibriform consistency to form a fibrous binder matrix or emulsion, the poultry skin or meat or mixture thereof being cooled during the comminution thereof. This binder matrix or emulsion has been found to have desirable binding characteristics. The binder matrix thus prepared is then admixed with pieces of raw poultry meat and the mixture packed into a flexible natural or synthetic casing. The encased mixture is next cooked and thereafter cooled. Upon cooling, the binder matrix effectively binds the pieces of poultry meat so that the resulting product may be readily sliced into integral slices at normal temperatures. As disclosed in the aforementioned Torr patent, the bond thus provided displays thermosetting properties.

Uncooked poultry products, such as roasts for example, have also been prepared using a binder matrix or emulsion made as described above for binding together pieces of poultry meat upon cooking of the product by the consumer. In making such roasts, it has been the practice to prepare a single fibrous binder matrix or emulsion by comminuting a mixture of raw poultry skin and white and dark poultry meat trimmings or scrap meat, with the mixture being cooled during comminution. The ratio of raw skin to meat trimmings in the mixture and the ratio of white to dark meat trimmings may be widely varied. The resulting emulsion or binder matrix is then admixed or blended with pieces of raw white poultry meat and pieces of raw dark poultry meat, respectively, and the pieces formed into the final roast product. In forming the roast, pieces of whole processed skin are placed over the bottom and sides of a metal mold having a curved bottom, the desired amounts of the blended white and dark meat pieces are packed into the mold and pressure is then applied to compact the pieces together into roast form. The excess skin is then trimmed away and the roast removed from the mold and packaged in an aluminum pan or the like. The roast is marketed in this form and upon cooking and subsequent cooling, the binder matrix binds together the white and dark pieces of meat to produce a roast having integrity at normal temperatures and which may be readily sliced into firm slices.

While the above described method of preparing uncooked poultry roasts is satisfactory in some respects, it suffers from a number of serious shortcomings which detract from its commercial utility. Thus, as mentioned, a single binder matrix composed of comminuted poultry skin and dark and white meat trimmings or scrap meat is utilized in preparing such roasts. It has been found that the inclusion of an excess amount of dark meat trimmings in the binder matrix has an adverse effect on the color of the final roast product, particularly the white meat portion thereof, thereby rendering the roast noticeably less appealing from the marketing standpoint. On the other hand, if smaller amounts of dark meat trimmings are included in the binder matrix, an imbalance is created between the dark and white meat trimmings utilized by the producer thereby resulting in an incomplete usage of all dark meat trimmings and consequently in uneconomical operation. Moreover, it has not been possible heretofore to utilize large amounts, i.e., up to 15% by weight based upon the weight of the white and dark meat pieces, of the binder matrix even though such amounts desirably enhance the flavor of the final roast product. The use of amounts greater than about 9–12% by weight has been found to adversely affect the appearance of the final product since such amounts tend to enrobe or cover the pieces of poultry meat rather than being absorbed thereby. As a result, the use of such large amounts of binder matrix visibly detracts from the appearance of the final product, the binder matrix being distinctly visible between and around the pieces of poultry meat. This is particularly noticeable as regards pieces of dark poultry meat from the thigh and leg which have a tough muscle sheaf (epimysium) which resists absorption of the binder matrix and which interferes with binding together of the white and dark poultry pieces upon cooking of the final roast product. There has been, therefore, an unfulfilled need for an improved method of preparing poultry products in the form of roasts and the like which does not suffer from the foregoing deficiencies.

Therefore, among the several objects of the present invention may be noted the provision of an improved method for preparing poultry food products; the provision of such a method which permits the increased utilization of scrap poultry meats and trimmings with substantial economies being thereby realized; the provision of a method of this type which produces a poultry product having an enhanced flavor and appearance; the provision of a method of the character indicated which yields a poultry product exhibiting an improved tenderness and cookability; the provision of such a method which produces enhanced weldability or binding together of the poultry pieces as well as imparting other desirable properties to the final product; and the provision of a method of the type indicated which may be conveniently and economically carried out on a commercial scale. Other objects and features will be in part apparent and in part pointed out hereinafter.

The invention accordingly comprises the products and methods hereinafter described, the scope of the invention being indicated in the following claims.

In accordance with the present invention, it now has been found that the above disadvantages of prior art methods may be overcome and improved results achieved by subjecting pieces of raw poultry meat used in the preparation of poultry food products to an incising operation whereby slits or shallow pockets are formed in such pieces without destroying the integrity of the pieces and thereafter mixing the incised pieces of poultry meat with a fibrous binder matrix or emulsion so as to embed the binder matrix in the slits. Poultry food products prepared according to the method of the invention not only are more economically produced on a commercial scale but such products possess improved properties which upgrade the quality and marketability thereof. Thus, the poultry products produced by the method of the invention exhibit enhanced flavor, palatability and tenderness as compared with similar products prepared according to the aforementioned prior art methods. Moreover, the present invention permits a more economical usage of scrap products or trimmings of both dark and white meat and thereby avoids the imbalance between the relative usage of white and dark scrap meat or trimmings encountered with prior art methods. The improved method of the present invention also produces poultry products which display an improved weldability or binding effect. These products further exhibit an increased flexibility which facilitates molding or forming of the products into roasts or other forms. Finally, it has been found that the method of the invention advantageously minimizes weeping of poultry products prepared thereby, i.e., minimizes exudation of moisture from the products in raw or frozen form.

In carrying out the invention, freshly eviscerated poultry (i.e., turkeys or chickens) or raw poultry which has been held in a frozen condition is first subjected to a skinning operation. Pinfeathers, discolorations, blemishes, bruises, excess fat and similar imperfections are removed from the skin, and the cleaned skins are cut into sections of sufficient size for use in covering approximately 75% of a poultry roast as described hereinafter. The skinned poultry meat is then removed from the poultry carcass in the largest pieces possible by a cutting and trimming operation, and care is taken to prevent the deboned poultry meat from reaching a temperature in excess of 50° F.

The large pieces of raw dark poultry meat obtained from the deboning step are incised so as to form slits or pockets in such pieces without destroying the integrity of the pieces or pulverizing or masticating them. These slits or pockets which are preferably formed over a relatively large portion of the surface of the pieces of dark poultry meat may, for example, be approximately ⅛ in. deep and ⅛ to ¼ in. in length. Thus, the incising operation results in severing or cutting of the surface meat fibers or in cutting through the tough muscle sheaf of the poultry meat from the thigh and leg portions of poultry, and thereby renders it possible for the meat to absorb greater amounts of a fibrous binder matrix and enables the pieces of meat to become more effectively bonded together upon cooking of the final roast product. However, this is accomplished without destroying the integrity of the poultry pieces and without pulverizing or masticating the pieces which would result in an undesirable, meat-loaf type final product rather than the desired natural meat texture roast type product.

While the incising operation may be carried out in any suitable manner to insure the formation of the desired slits or pockets on the surface of the poultry pieces, we have found that incising may be conveniently and effectively performed using commercially available meat processing machines such as those disclosed in U.S. Patents 2,364,533, 2,472,800, 2,513,025 and 2,605,497. In general, such machines are provided with a pair of processing rollers or members having a series of parallelly disposed disc blades which are shaped with teeth having arcuated sharp knife blades formed on the ends thereof. Poultry meat fed into such machines passes between the rollers whereupon the knife blades cut slits in the meat on both sides thereof but preferably should not extend through the entire thickness of the meat piece. As indicated, the blades cut or sever the surface fibers of the meat and the machines are provided with a sufficient number of blades so that slits are formed substantially over the entire surface area of the meat pieces. It will be understood that similar types of meat processing or treating machines may also be employed for incising the meat or alternatively, the incising could be accomplished by a manual slitting operation, if desired.

Although the incising operation may be carried out on relatively large pieces of both white and dark poultry meat, the preferred form of the invention contemplates incising only the dark poultry meat pieces since such meat possesses a tougher muscle fiber and sheath structure than white poultry meat, which heretofore has adversely affected: (1) formability into compact poultry rolls or roasts, (2) adherence of the pieces of meat to each other and to the binder matrix, (3) and the impaction or embedding of natural flavoring and tenderizing components therein. Because of this difference in muscle structure, unincised white poultry meat will normally absorb or have naturally embedded therein substantially greater amounts of a fibrous binder matrix upon admixing therewith than will unincised dark poultry meat, particularly dark meat from the legs and thighs as previously noted. In any event, the fibrous binder matrix does not detract from the appearance of the white poultry meat at a given level of incorporation therein to the extent experienced with dark poultry meat. However, it will be understood that both the dark and white poultry meat pieces may be subjected to incising if so desired.

After the raw poultry meat pieces have been prepared as described, fibrous binder matrices or emulsions are prepared for admixing or blending with the white and dark meat pieces, respectively. These fibrous products are generally prepared in accordance with the methods described in Torr Patent 3,173,795 using the scrap skin previously prepared and the small trimmings or pieces of meat cut off during deboning and/or trimming and which were considered unsuitable for incising or incorporation as such in the final roast product. As noted in the aforementioned Torr patent, the fibrous binder matrix products may be made from raw poultry skin or from a mixture of raw skin and poultry meat. In order to effect economic utilization of both raw skin and substantially all raw scrap or trimmings, whether of white or dark meat, and avert an imbalance between the supplies of such materials, two fibrous binder matrix products are prepared, one being composed of raw skin and raw dark scrap meat or trimmings and the other being composed of raw skin and raw white scrap meat or trimmings.

In preparing these products, the ratio of skin to meat trimmings may be varied within limits according to the available supplies of these materials and the economics of processing. Generally, the batch formula for preparing each of the two binder matrix products may contain between approximately 31.67% and 49.54% by weight of raw poultry skin and between 39.71% and 57.58% by weight of raw meat trimmings, the latter being composed of white meat in one instance and dark meat in the other. Various intermediate ratios are, of course, useful and satisfactory in practicing the invention. Preferably, the mixture of poultry skin and meat constitutes approximately 89.25% by weight of the batch formula. The remaining 10.75% of the formula consists, illustratively, of approximately 7.12% by weight of ice, approximately 2.00% by weight of salt coated, if desired, with an appropriate antioxidant and approximately 1.63% of an aqueous solution containing sodium erythorbate, sodium phosphate and brown sugar.

In preparing the binder matrix products and reducing the mixture of raw skin and raw white or dark meat to comminuted fibriform consistency, a chilled mixture of the skin and meat and the above-noted aqueous solution are first placed in a standard cutter. It is preferable to use a rotating bowl type cutter, such as that known in the art under the trade designation "Schnellkutter," equipped with rotating cutting blades. The mixture is first prechopped for a short period after which the salt and ice are added while chopping is continued at high speed. For best results, the mixture is comminuted or chopped for a total of approximately two minutes. The resulting binder matrix is an emulsion-like material which is pink in color and tacky and paste-like in appearance. The matrix prepared with raw white meat trimmings is light pink in color while that prepared with dark meat trimmings is characterized by a deep pink color. Preferably, the temperature of the binder matrix mixture is not permitted to exceed approximately 50° F. during preparation of the matrix, and after preparation the matrix should be held until use at a temperature not in excess of approximately 50° F.

After the two types of binder matrix products of fibriform consistency have been separately prepared as described, they are removed from the cutter and admixed with the deboned and incised poultry pieces previously prepared and set aside. The binder matrix containing white meat trimmings is used for admixing with pieces of raw white poultry meat and the binder matrix containing dark meat trimmings is used for admixing with pieces of raw dark poultry meat. Preferably, the batch formula for preparing each of the two admixed products may contain between approximately 81.5% and 84.5% by weight of the raw poultry meat pieces, white meat in the one case and dark meat in the other, and between approximately 12% and 15% by weight of the binder matrix products, one having been prepared from the white meat trimmings and the other from the dark meat trimmings as described. As previously indicated, the usage of higher amounts (i.e., 15% by weight) of the binder matrix products gives satisfactory results, and is, in fact, advantageous since it permits more effective and economic utilization of the scrap products from which the binder matrices are prepared. The mixture of binder matrix and pieces of raw poultry meat preferably constitute approximately 96.7% by weight of the product, the remaining 3.3% consisting, for example, of approximately 1.25% by weight of salt coated, if desired, with an appropriate antioxidant and approximately 2.08% by weight of an aqueous solution containing sodium phosphate, brown sugar and sodium erythorbate. The sodium phosphate functions to aid the final product in retaining the natural poultry juices, the brown sugar functions as a flavoring agent and the sodium erythorbate promotes retention of the desired meat color in the final product.

In practice, it is preferred to place the pieces of raw poultry meat in a conventional blender or mixing apparatus and first add the above-noted aqueous solution thereto and thoroughly blend the solution into the meat to lock in the moisture. The salt is then added while blending is continued, and finally, the binder matrix is added and blending thereof into the meat mixture is completed. The white and dark meat admixtures are prepared separately using the same general procedure, the binder matrix containing the white meat trimmings being admixed in this manner with the pieces of raw white poultry meat and the binder matrix containing the dark meat trimmings being similarly admixed with the pieces of raw dark poultry meat which has been previously incised. During this blending or admixing operation, the binder matrix product becomes thoroughly embedded in the slits formed in the pieces of poultry meat by the previously described incising operation. The binder matrix also becomes embedded to some extent in the muscle tissue of the raw poultry pieces, both in the incised pieces of dark meat and to a greater extent in the incised or unincised pieces of white meat. The blending or admixing operation, as described, should be carried out for a sufficient period of time to achieve thorough embedding of the binder matrix products into the raw poultry pieces, and this generally required blending for a period of from four to six minutes.

In preparing the final product from the white and dark meat binder matrix-poultry meat admixtures, it is preferable to use stainless steel molds having curved bottoms together with a manual or hydraulic press for pressure packing the meat into the molds. First, whole processed skin is placed over the bottom and sides of the mold and arranged to cover the sides and top of the roast product providing coverage for at least 75% of the surface area. Next, the desired amount of the white meat-binder matrix product is weighed out and packed into the bottom of the mold and the desired amount of the dark meat-binder matrix product is weighed out and placed on top of the white meat. In general, it is preferred that between approximately 47% and 52% by weight of the final product be constituted by the white meat admixture and between approximately 30% and 35% by weight of the final product be constituted by the dark meat admixture. The balance of the final product is made up of the covering whole skin, giblet mix and, if desired, a gravy preparation separately packaged. After the required amount of dark and white meat have been placed in the mold, the mixture is pressure packed to roast form either manually or by means of a hydraulic press. Sufficient pressure is employed to attain at least partial binding together of the white and dark meat pieces by means of the binder matrix embedded in these pieces, this binding effect being sufficient to enable the roast product to retain its shape until it has been frozen. In general, pressures on the order of 1-5 p.s.i. have been found satisfactory for this purpose. Higher pressures should be avoided as they tend to distort the shape of the product and do not produce the desired roast form. Following pressure packing, the excess skin is trimmed away and the roast is removed from the mold. The roast is then suitably packaged and properly frozen for storage and marketing. It will be understood that the final product may be similarly prepared in roll or loaf form.

In use, the uncooked, frozen roast product is placed, without thawing, in an oven preheated to approximately 450° F. The roast is cooked at this temperature for approximately two and one half hours or until a meat thermometer inserted therein registers about 180° F. During cooking and subsequent cooling, the fibrous matrix effects binding of the white and dark pieces of meat so that the cooked product may be readily sliced into slices which retain their integrity and remain firm at normal temperatures. The binding of the white and dark poultry meat pieces through the fibrous binder matrix admixed with such pieces, including that embedded in the slits in the dark meat pieces or dark and white meat pieces, is characterized by being thermosetting in nature and therefore, the cooked roast product may be preheated without affecting the desired integrity or sliceability thereof.

Not only does the cooked roast product display this advantageous thermosetting property, but through preparation according to the method of the invention, the product exhibits a noticeably enhanced flavor, palatability, appearance, and tenderness without loss of natural meat texture. These desirable objectives are realized while at the same time the method of the invention permits a greater utilization of scrap poultry meat and trimmings than was heretofore possible using prior art methods and further utilizes such scrap meat and trimmings to enhance the desirable qualities of the product. Thus, the present invention not only produces an improved poultry product but does so on a basis which is commercially economical.

The following example illustrates the invention.

Freshly eviscerated turkeys were used in preparing a roast product in accordance with the method of the invention. The turkeys were first skinned and the cleaned skins having imperfections such as pin-feathers and blemishes removed therefrom were set aside and kept at a temperature of less than 50° F. for use in covering the final roast product. The meat was next removed from the turkey carcasses in the largest pieces possible following conventional deboning and sectioning procedures. The trimmings and small pieces of scrap and skin were set aside for use in preparing the fibrous binder matrix or emulsion products.

All of the large pieces of raw dark turkey meat resulting from the sectioning and deboning operation were subjected to incising by being fed through a commercial meat treating machine equipped with knife blades for cutting slits or pockets in the meat pieces. The thus treated pieces of dark meat had on both sides thereof slits or pockets approximately 1/8" deep and approximately 1/4" in length. Care was taken to avoid pulverizing or masticating the pieces of dark poultry meat.

Next, two fibrous binder matrix products were prepared. A mixture of scrap skin (31 lbs., 11 oz.) dark meat trimmings (57 lbs., 9 oz.) from the deboning and sectioning operation and an aqueous solution (1 lb., 10 oz.) containing a mixture of sodium phosphate, brown sugar and sodium erythorbate, was added to a commercial type cutter (known as a "Schnellkutter") and prechopped on low speed for 15 seconds. Salt coated with a butylated hydroxyanisole antioxidant (sold under the trade designation "Tenox A") (2 lbs.) was added and the chopping continued at high speed for 15 seconds. Ice (3 lbs., 9 oz.) was added and chopping continued for 15 seconds. Chopping was then discontinued and the resulting emulsion which had a deep pink color was removed from the cutter bowl. A second binder matrix or emulsion product was prepared following the same procedure but using a like quantity of white meat trimmings in lieu of the dark meat trimmings. The two binder matrix products were held for further use at a temperature of less than 50° F.

A quantity of incised dark meat pieces (244 lbs.) was placed in a commercial type blender and a quantity of the aforedescribed aqueous solution (7 lbs., 4 oz.) was distributed uniformly on the meat and the blender rotated for one minute. Salt coated with a butylated hydroxyanisole antioxidant (3 lbs., 12 oz.) was then added to the resulting mixture and the blender rotated for thirty seconds. The binder matrix product prepared from the dark meat trimmings (45 lbs.) was added uniformly over the mixture and the blender rotated for an additional 2½ to 3½ minutes. The resulting product was a mixture of dark pieces of raw turkey meat having the binder matrix thoroughly embedded in the slits previously formed in these pieces in the incising operation. A like procedure was followed in admixing similar quantities of white meat pieces and the binder matrix previously prepared from white meat trimmings. In this case, the binder matrix or emulsion was absorbed by the muscle tissue and the resulting product was an intimate admixture of the raw white turkey meat pieces and binder matrix.

The cleaned, whole processed skin (3 oz.) previously set aside from the skinning operation was placed over the bottom and four sides of a stainless steel mold (measuring approximately 8" x 3" x 4¼") and arranged to cover the four sides and bottom. The previously blended white meat-binder matrix mixture (19 oz.) was weighed out and packed into the bottom of the mold and the previously blended dark meat-binder matrix mixture (14 oz.) was weighed out and placed on top of the white meat. The mixture in the mold was then pressure packed under a pressure of approximately 1.5 p.s.i. The excess skin was trimmed away and the roast removed from the mold. A quantity of giblet mix (3 oz.) was added to the bottom of an aluminum pan and the roast (2½ lbs.) was placed in the pan. The roast was covered with a sheet of aluminum foil and the pan closed with a paper lid. The roast was then ready for freezing, storage and marketing.

In view of the above, it will be seen that the several objects of the invention are achieved and other advantageous results attained.

As various changes could be made in the above methods and products without departing from the scope of the invention, it is intended that all matter contained in the above description shall be interpreted as illustrative and not in a limiting sense.

What is claimed is:

1. The method of preparing a poultry product which comprises the steps of comminuting raw poultry parts selected from the group consisting of poultry skin, poultry meat and mixtures thereof to fibriform consistency to form a fibrous binder matrix, cooling the poultry parts during comminution thereof, incising pieces of raw dark poultry meat having a muscle sheaf thereon so as to form slits through the muscle sheaf and into the dark poultry meat without destroying the integrity of the pieces, mixing the incised pieces of dark poultry meat with said matrix to imbed said matrix into said slits, and forming the resulting mixture into a product under a pressure sufficient to effect at least a partial binding together of the dark poultry meat pieces, the imbedded matrix in the incised pieces being effective to insure that the muscle sheaf does not prevent binding between the dark poultry pieces and matrix, said product, upon cooking, being capable of being sliced into integral slices and of retaining its integrity at normal and heated temperatures, and said imbedded matrix enhancing the flavor of the incised pieces in said product and binding the incisions therein to form a natural meat texture of said pieces.

2. The method of preparing a poultry product as set forth in claim 1 wherein said slits are formed over a relatively large portion of the surface of said dark pieces of poultry meat.

3. The method of preparing a poultry product as set forth in claim 1 including the steps of forming an admixture of white poultry meat pieces and a second binder matrix composed of raw skin and raw white scrap meat comminuted to fibriform consistency, mixing the white poultry meat admixture with the incised pieces of dark poultry meat and first named binder matrix prior to forming the mixture into said product, the first named binder matrix mixed with the incised pieces of dark poultry meat being composed of raw skin and raw dark scrap meat comminuted to fibriform consistency, and thereafter forming the incised dark poultry meat pieces, first named binder matrix and white poultry meat admixture into said product under a pressure sufficient to effect at least a partial binding together of the dark poultry meat pieces and white poultry meat pieces.

References Cited

UNITED STATES PATENTS

| | | | |
|---|---|---|---|
| 2,868,650 | 1/1959 | Hammerberg | 99—107 |
| 3,154,423 | 10/1964 | Voegeli et al. | 99—107 X |
| 3,173,795 | 3/1965 | Torr | 99—108 |
| 3,188,213 | 6/1965 | Delaney | 99—107 |

HYMAN LORD, Primary Examiner